United States Patent
Ogawa et al.

(10) Patent No.: US 8,813,888 B2
(45) Date of Patent: Aug. 26, 2014

(54) VEHICLE BODY REAR STRUCTURE

(71) Applicant: Honda Motor Co., Ltd., Tokyo (JP)

(72) Inventors: Masayuki Ogawa, Utsunomiya (JP); Takenobu Haga, Tochigi (JP); Tohru Kikuchi, Tochigi (JP); Junichi Kojima, Utsunomiya (JP); Masanori Kisaku, Utsunomiya (JP); Takashi Katou, Utsunomiya (JP); Yoshihiro Kobayashi, Utsunomiya (JP); Itsuo Kimura, Utsunomiya (JP); Kazutaka Kanezashi, Utsunomiya (JP); Keiichiro Okuyama, Tochigi (JP)

(73) Assignee: Honda Motor Co., Ltd., Tokyo (JP)

( * ) Notice: Subject to any disclaimer, the term of this patent is extended or adjusted under 35 U.S.C. 154(b) by 24 days.

(21) Appl. No.: 13/751,338

(22) Filed: Jan. 28, 2013

(65) Prior Publication Data

US 2013/0200654 A1    Aug. 8, 2013

(30) Foreign Application Priority Data

Feb. 6, 2012  (JP) ................. 2012-023105
Feb. 6, 2012  (JP) ................. 2012-023106

(51) Int. Cl.
*B60R 16/04*    (2006.01)
*B62D 25/08*    (2006.01)
*B60K 1/04*     (2006.01)

(52) U.S. Cl.
CPC ............ *B62D 25/082* (2013.01); *B62D 25/087* (2013.01); *B60K 1/04* (2013.01)
USPC ......................................... 180/180; 180/65.1

(58) Field of Classification Search
USPC ................................................ 180/65.1, 68.5
See application file for complete search history.

(56) References Cited

U.S. PATENT DOCUMENTS

| | | | | |
|---|---|---|---|---|
| 5,704,644 A * | 1/1998 | Jaggi | ............................. | 280/796 |
| 6,085,854 A * | 7/2000 | Nishikawa | ................... | 180/68.5 |
| 6,632,560 B1 * | 10/2003 | Zhou et al. | ...................... | 429/99 |
| 6,817,656 B2 * | 11/2004 | Stoffels et al. | ........... | 296/203.02 |
| 6,905,138 B2 * | 6/2005 | Borroni-Bird et al. | ....... | 280/783 |
| 7,004,233 B2 * | 2/2006 | Hasegawa et al. | .............. | 165/47 |
| 7,025,160 B2 * | 4/2006 | Awakawa | ..................... | 180/68.5 |
| 7,556,113 B2 * | 7/2009 | Amori et al. | ................. | 180/68.5 |
| 7,614,469 B2 * | 11/2009 | Kumar et al. | ................ | 180/68.5 |
| 7,654,351 B2 * | 2/2010 | Koike et al. | .................. | 180/68.5 |
| 7,690,686 B2 * | 4/2010 | Hashimura et al. | .......... | 280/782 |
| 7,905,307 B2 * | 3/2011 | Kubota et al. | ................ | 180/68.1 |
| 8,051,934 B2 * | 11/2011 | Kiya et al. | ................... | 180/68.5 |

(Continued)

FOREIGN PATENT DOCUMENTS

JP    2009-274665 A    11/2009

*Primary Examiner* — Hau Phan
*Assistant Examiner* — Jacob Meyer
(74) *Attorney, Agent, or Firm* — Carrier Blackman & Associates, P.C.; Joseph P. Carrier; William D. Blackman

(57) ABSTRACT

An IPU protection guard includes a pair of left and right upper horizontal members, which extend along a forward and rearward direction on an upper portion of an IPU on both sides in a vehicle width direction of the IPU, a pair of left and right lower horizontal members, which extend along the forward and rearward direction on a lower portion of the IPU on both sides in the vehicle width direction of the IPU, and an X-shaped member which extends in an X shape along a rear surface of the IPU.

15 Claims, 15 Drawing Sheets

(56) References Cited

U.S. PATENT DOCUMENTS

| | | | |
|---|---|---|---|
| 8,276,696 B2* | 10/2012 | Lucas | 180/68.2 |
| 8,430,194 B2* | 4/2013 | Yamatani | 180/68.1 |
| 8,453,778 B2* | 6/2013 | Bannier et al. | 180/68.5 |
| 8,511,412 B2* | 8/2013 | Kawaguchi et al. | 180/68.5 |
| 8,540,282 B2* | 9/2013 | Yoda et al. | 280/784 |
| 8,567,543 B2* | 10/2013 | Kubota et al. | 180/68.5 |
| 8,584,779 B2* | 11/2013 | Tsuchiya et al. | 180/68.5 |
| 8,585,128 B2* | 11/2013 | Hoshino | 296/187.05 |
| 2003/0186115 A1* | 10/2003 | Shibasawa et al. | 429/100 |
| 2004/0079569 A1* | 4/2004 | Awakawa | 180/68.5 |
| 2008/0283317 A1* | 11/2008 | Wagner et al. | 180/68.5 |
| 2010/0289295 A1 | 11/2010 | Yoda et al. | |
| 2011/0297469 A1* | 12/2011 | Usami et al. | 180/68.5 |
| 2012/0125704 A1* | 5/2012 | Kawaguchi et al. | 180/68.5 |
| 2012/0175177 A1* | 7/2012 | Lee et al. | 180/68.5 |
| 2013/0015683 A1* | 1/2013 | Minami | 296/187.08 |
| 2013/0037337 A1* | 2/2013 | Auer et al. | 180/68.5 |
| 2013/0175104 A1* | 7/2013 | Murray | 180/65.1 |
| 2013/0341107 A1* | 12/2013 | Choo et al. | 180/65.1 |
| 2014/0083787 A1* | 3/2014 | Lyons, Travis | 180/68.5 |

* cited by examiner

PRIOR ART

VEHICLE BODY REAR STRUCTURE

CROSS-REFERENCE TO RELATED APPLICATION

Priority is claimed on Japanese Patent Application No. 2012-023106 filed on Feb. 6, 2012 and Japanese Patent Application No. 2012-023105 filed on Feb. 6, 2012, the contents of which are incorporated herein by reference.

BACKGROUND OF THE INVENTION

1. Field of the Invention

The present invention relates to a vehicle body rear structure.

2. Description of Related Art

Hitherto, there have been cases where an IPU (intelligent power unit) including a battery and the like is mounted in a luggage space to the rear of the rear seat of an electric car, a hybrid vehicle, or the like.

For such a vehicle, for example, a technique for protecting the IPU by suppressing an impact load input to a vehicle body from being transmitted to the IPU in a case of a rear-end collision (hereinafter, referred to as rear collision) has been suggested (for example, refer to Japanese Unexamined Patent Application, First Publication No. 2009-274665). Specifically, in Japanese Unexamined Patent Application, First Publication No. 2009-274665, protection frames connected in such a manner that a plurality of frames surround the entire periphery of the IPU are included, and the protection frames are fixed to a pair of rear frames provided on both sides in a vehicle width direction or to a floor panel disposed between the rear frames.

SUMMARY OF THE INVENTION

However, in the configuration of Japanese Unexamined Patent Application, First Publication No. 2009-274665 described above, since the protection frames are disposed to surround the entire periphery of the IPU, there is a problem in that an increase in the number of components and an increase in the weight of a vehicle body are caused.

In particular, recently, there has been an increase in vehicles in which the amount of travel using an IPU battery is high, and accordingly, which has resulted in an increase in the size of the IPU.

However, since there is a limitation on the luggage space, the disposition of the protection frames to surround the periphery of an IPU as in Japanese Unexamined Patent Application, First Publication No. 2009-274665 described above causes to reduce in the size of the IPU disposed inside the protection frames. Therefore, there is a problem in that the travelling distance is reduced.

Aspects according to the present invention have been made taking the foregoing circumstances into consideration, and an object thereof is to provide a vehicle body rear structure capable of achieving a reduction in the number of components and in weight and an increase in size, and of reliably protecting an electric device.

However, FIG. 16 is a schematic configuration diagram of a vehicle body rear structure according to the related art as viewed from the side.

As illustrated in FIG. 16, a rear frame 201 as the rear frame described above includes a kick-up portion 202 tilted upward as it goes rearward, and a rearward extension portion 203 that extends rearward from the upper end portion (rear end portion) of the kick-up portion 202. In addition, in Japanese Unexamined Patent Application, First Publication No. 2009-274665 described above, the protection frames (not shown) are fixed to the rearward extension portion 203 side between the rear frames 201.

In the rear frame 201, during a rear collision or the like, when an impact load is input to the rear frame 201, the rearward extension portion 203 undergoes buckling deformation in the forward direction, and a bending stress is exerted to the boundary part between the kick-up portion 202 and the rearward extension portion 203. Therefore, the rear frame 201 is raised upward (see the chain line in FIG. 16).

In addition, in a sedan type vehicle or the like, a parcel cross member 204 that divides the vehicle interior and the luggage space is disposed in the rear of the rear seat (not shown). In this case, the interval in the vertical direction between an IPU 205 and the parcel cross member 204 is narrow, and thus there is concern of the IPU 205 and the parcel cross member 204 interfering with each other during the rear collision described above (see the chain line in FIG. 16).

As described above, recently, there has been an increase in vehicles in which the amount of travel using the battery of the IPU 205 is high, and, as a result, the size of the IPU 205 has increased. Therefore, there is a tendency to further reduce the interval between the IPU 205 and the parcel cross member 204 described above.

Aspects according to the present invention have been made taking the foregoing circumstances into consideration, and an object thereof is to provide a vehicle body rear structure capable of suppressing a rear frame from being raised during a rear collision and of thus reliably protecting an electric device.

The embodiments of the present invention employ the following aspects in order to accomplish the objects.

(1) According to an aspect of the present invention, there is provided a vehicle body rear structure including: a pair of left and right rear frames, which extend along a forward and rearward direction of a vehicle body on both sides along a vehicle width direction; an electric device which is disposed between the rear frames and supplies power to an electric motor for travelling; and a protection guard which surrounds the electric device from behind, wherein the protection guard includes a pair of left and right upper horizontal members, which extend along the forward and rearward direction above the electric device on both sides in the vehicle width direction of the electric device, a pair of left and right lower horizontal members, which extend along the forward and rearward direction below the electric device on both the sides in the vehicle width direction of the electric device, and an X-shaped member which extends in an X shape along a rear surface of the electric device, and the X-shaped member bridges between the upper horizontal member on one side along the vehicle width direction from among the upper horizontal members and the lower horizontal member on the other side along the vehicle width direction from among the lower horizontal members, and between the upper horizontal member on the other side and the lower horizontal member on the one side.

(2) In the aspect of (1), the protection guard may include vertical members which bridge between end portions on the one side along the vehicle width direction and between end portions on the other side in the X-shaped member, the X-shaped member and the vertical members may be formed by extrusion molding of an aluminum alloy, and the lower horizontal member and the upper horizontal member may be made of steel pipes.

(3) In the aspect of (2), both upper and lower end portions of the vertical member may be respectively fastened to rear end portions of the upper and lower horizontal members.

(4) In the aspect of (2) or (3), the vertical member may be provided with a rib which divides an internal portion thereof in the vehicle width direction.

(5) In any of the aspects of (2) to (4), a corner member which connects the X-shaped member to each of the vertical members may be provided inside a corner which is formed by an extension direction of the X-shaped member and an extension direction of each of the vertical members at a connection part between the X-shaped member and each of the vertical members, and a corner plate which is bonded to the corner member, the X-shaped member, and the vertical member from the forward and rearward direction may be provided at the connection part.

(6) In any of the aspects of (2) to (5), cooling air ducts through which cooling air for cooling the electric device is circulated may extend on the opposite side to the electric device with the vertical members interposed therebetween, and each of the upper horizontal member and the lower horizontal member may extend outward in the vehicle width direction as it goes forward.

(7) In any of the aspects of (2) to (6), the rear end portion of the lower horizontal member may increase in width along the vehicle width direction as it goes rearward and may include a fastening portion fastened to a rear end portion of the rear frame.

(8) In the aspect of (1), the rear frame includes a kick-up portion which is tilted downward as it goes forward, and a rearward extension portion which extends rearward from a rear end of the kick-up portion, an electric device is disposed at a part where the kick-up portion is positioned between the rear frames, a reinforcing bar which extends along the forward and rearward direction following the rear frame is provided on an upper surface of the rear frame, and the reinforcing bar includes a front end fastening portion fastened to the kick-up portion, a rear end fastening portion fastened to the rearward extension portion, and an intermediate fastening portion fastened to the kick-up portion between the front end fastening portion and the rear end fastening portion.

(9) In the aspect of (8), a stiffener which connects the kick-up portion to a side sill disposed in front of the kick-up portion may be provided in the kick-up portion, and the front end fastening portion of the reinforcing bar may be fixed to the stiffener with the kick-up portion interposed therebetween.

(10) In the aspect of (8) or (9), the reinforcing bar may have a closed cross-sectional structure in which a lower member and an upper member made of press components are bonded in a vertical direction, and may be curved outward and downward as it goes forward.

(11) In any of the aspects of (8) to (10), the rear end fastening portion may increase in width along the vehicle width direction as it goes rearward, and to a rear end surface thereof, a protection guard which surrounds the electric device from behind may be attached.

(12) In any of the aspects of (8) to (11), in a lower surface of the reinforcing bar, at a part where at least one fastening portion of the fastening portions is positioned, a pedestal portion which is swollen in a downward direction and abuts the rear frame may be formed.

(13) In any of the aspects of (8) to (12), the intermediate fastening portion may be fastened to, in a bulk head positioned in the rear frame or in a part positioned in the vicinity of the bulk head in the rear frame.

(14) In any of the aspects of (8) to (13), the front end fastening portion may include a collar which penetrates through the lower surface of the reinforcing bar and abuts the upper surface of the rear frame.

(15) In any of the aspects of (8) to (14), a mounting frame which supports the electric device from below may be provided between the rear frames, and the reinforcing bar may be provided with an attaching portion which supports the electric device from both sides in the vehicle width direction.

According to the aspect of (1), during a rear collision or the like, the input load exerted on the protection guard is transmitted outward in the vehicle width direction from the intersection part of the X-shaped member and is thereafter transmitted forward via the lower horizontal member and the upper horizontal member on the outside in the vehicle width direction of the X-shaped member. That is, the input load transmitted to the protection guard is transmitted by bypassing the electric device, thereby suppressing the input load from being directly exerted on the electric device.

In this case, there is no need for the protection guard to surround the entire periphery of the electric device, unlike the related art, and thus reductions in the number of components and in weight may be achieved. In addition, the protection guard is disposed on the rear surface of the electric device only and the upper and lower portions on both sides in the vehicle width direction thereof, and thus the installation space of the battery protection guard may be suppressed. Accordingly, an increase in the size of the electric device disposed on the inside of (in front of) the protection guard may be achieved.

As a result, reductions in the number of components and in weight and an increase in the size of the electric device are achieved, and then the electric device may be reliably protected.

In the case of (2), since the X-shaped member and the vertical member are formed by extrusion molding of aluminum alloys, the bending strength may be increased. In addition, since each of the horizontal members is formed of a steel pipe, the buckling strength thereof may be increased. Therefore, the resistance to the input load from the rear may be enhanced while achieving a reduction in weight. Accordingly, the electric device may be protected more reliably.

In the case of (3), both the upper and lower end portions of the vertical member may be respectively fastened to the rear end portions of the upper and lower horizontal members, and thus the horizontal members and the vertical members may be separated into units that are easy to handle. Therefore, assembly characteristics in a case of assembling the protection guard into the luggage space may be enhanced.

In the case of (4), the bending strength of the vertical member may further be enhanced.

In the case of (5), the bonding strength of the X-shaped member and the vertical member may be enhanced.

In the case of (6), the internal space of the battery protection guard, that is, the installation space of the battery may be enlarged after avoiding the cooling air ducts.

In the case of (7), since the rear end portion of the lower horizontal member is formed to increase in width, the battery protection guard and the rear end fastening portion may be assembled in the rear end portion of the lower horizontal member having the increased width, thereby enhancing layout characteristics of assembly.

In the case of (8), since the reinforcing bar is fixed to the rear frame at three points of the front end fastening portion, the intermediate fastening portion, and the rear end fastening portion, bending of the boundary part between the kick-up portion and the rearward extension portion is suppressed, thereby suppressing the rear frame from being raised upward.

As a result, the interference between the electric device and the rear parcel shelf (parcel cross member) disposed above the electric device may be suppressed, and thus the electric device may be reliably protected.

In the case of (9), since the front end fastening portion is fixed to the stiffener with the kick-up portion interposed therebetween, the reinforcing bar may be disposed on the tilted surface of the kick-up portion, and the strength and rigidity of the kick-up portion may be enhanced. Accordingly, the rear frame may be reliably suppressed from being raised.

In the case of (10), since the reinforcing bar is bonded to the lower member and the upper member which are press-formed, it is possible to form the reinforcing bar by 3D bending. Therefore, the reinforcing bar may be reliably disposed following the upper surface of the rear frame, and thus the strength and rigidity of the rear frame may be reliably enhanced.

In the case of (11), since the rear end fastening portion of the reinforcing bar is formed to increase in width, the protection guard and the rear end fastening portion may be assembled in the rear end fastening portion of the reinforcing bar having the increased width, thereby enhancing layout characteristics of assembly.

In the case of (12), since the pedestal portions that abut on the upper surface of the rear frame are formed, a gap may be formed between the lower surface of the reinforcing bar and the rear frame in the vertical direction in parts other than the pedestal portions. Therefore, the interference between the rear frame and the reinforcing bar due to vibration or the like is suppressed, and noise that is generated by the interference may be reduced.

In addition, since the interference between the rear frame and the reinforcing bar is suppressed, rust prevention performance may be ensured without providing a dust sealer or the like for rust prevention therebetween.

In the case of (13), since the intermediate fastening portion is fastened to, in the bulk head disposed inside the rear frame or in the rear frame, the part positioned in the vicinity of the bulk head, the fastening strength of the intermediate fastening portion and the rear frame is enhanced, thereby further suppressing the rear frame at the kick-up portion from being raised.

In the case of (14), since the front end fastening portion is provided with the collar that penetrates through the lower surface of the reinforcing bar and abuts the upper surface of the rear frame, the cross-sectional crushing of the reinforcing bar is suppressed, thereby enhancing the fastening strength of the front end fastening portion and the rear frame.

In the case of (15), since the electric device is supported from the side by the attaching portion of the reinforcing bar in addition to the mounting frame, oscillation of the electric device is suppressed during turning or the like, and thus the electric device may be stably supported.

DETAILED DESCRIPTION OF THE INVENTION

Figure 1:
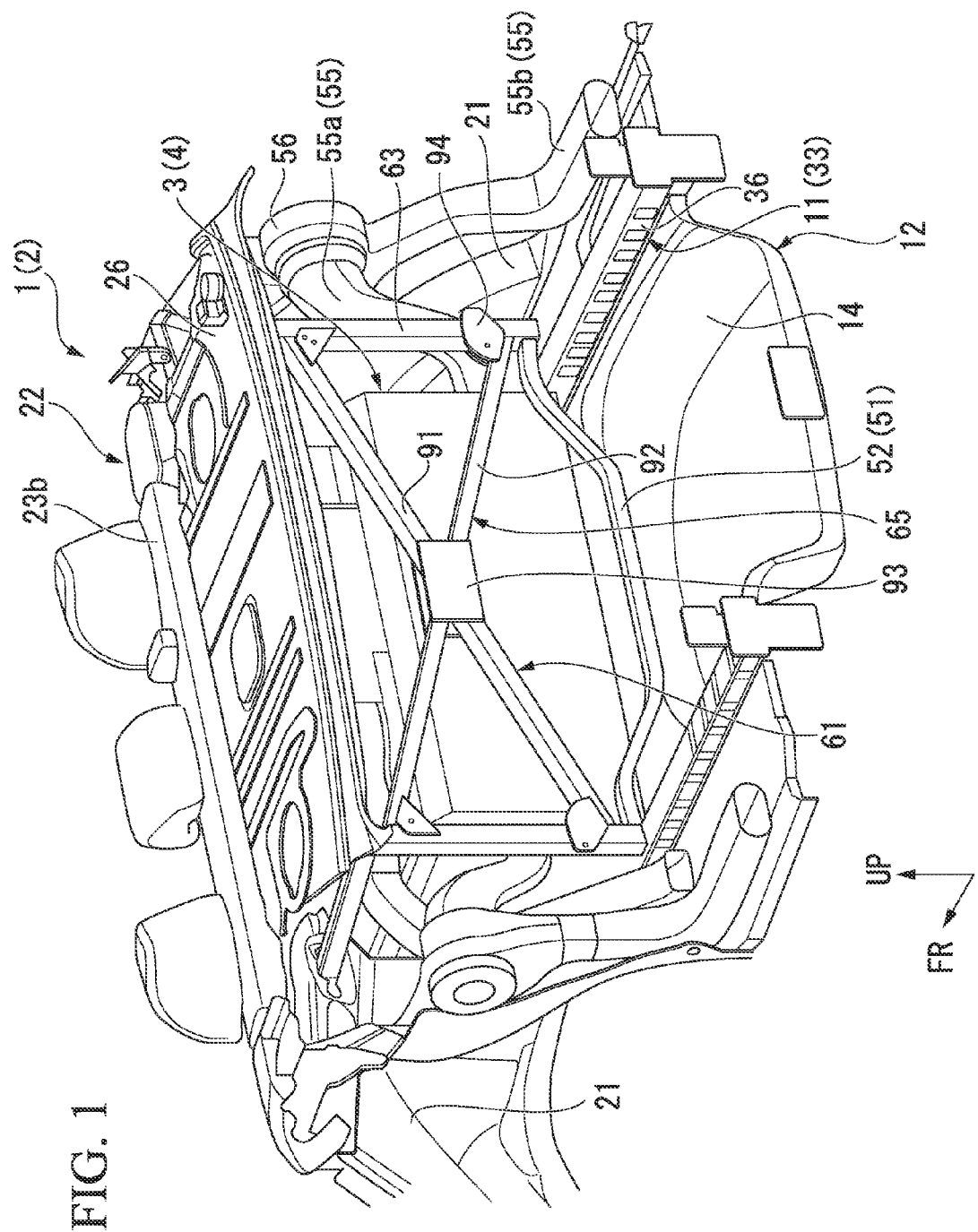
FIG. 1 is a perspective view of a sedan type vehicle that employs a vehicle body rear structure according to an embodiment of the present invention as viewed from a rearward and upwardly tilted direction.

Next, embodiments of the present invention will be described on the basis of the drawings. In addition, forward, rearward, left, and right directions and the like in the following description are the same as the directions in a vehicle if not particularly described. In addition, the arrow FR in the figures represents the forward direction of a vehicle, and the arrow UP represents the upward direction of the vehicle. FIG. 1 is a perspective view of a sedan type vehicle that employs a vehicle body rear structure according to an embodiment of the present invention as viewed from a rearward and upwardly tilted direction, and FIG. 2 is a plan view of the vehicle body rear structure illustrating a state where an IPU (electric device) and a rear seat are detached.

Figure 2:
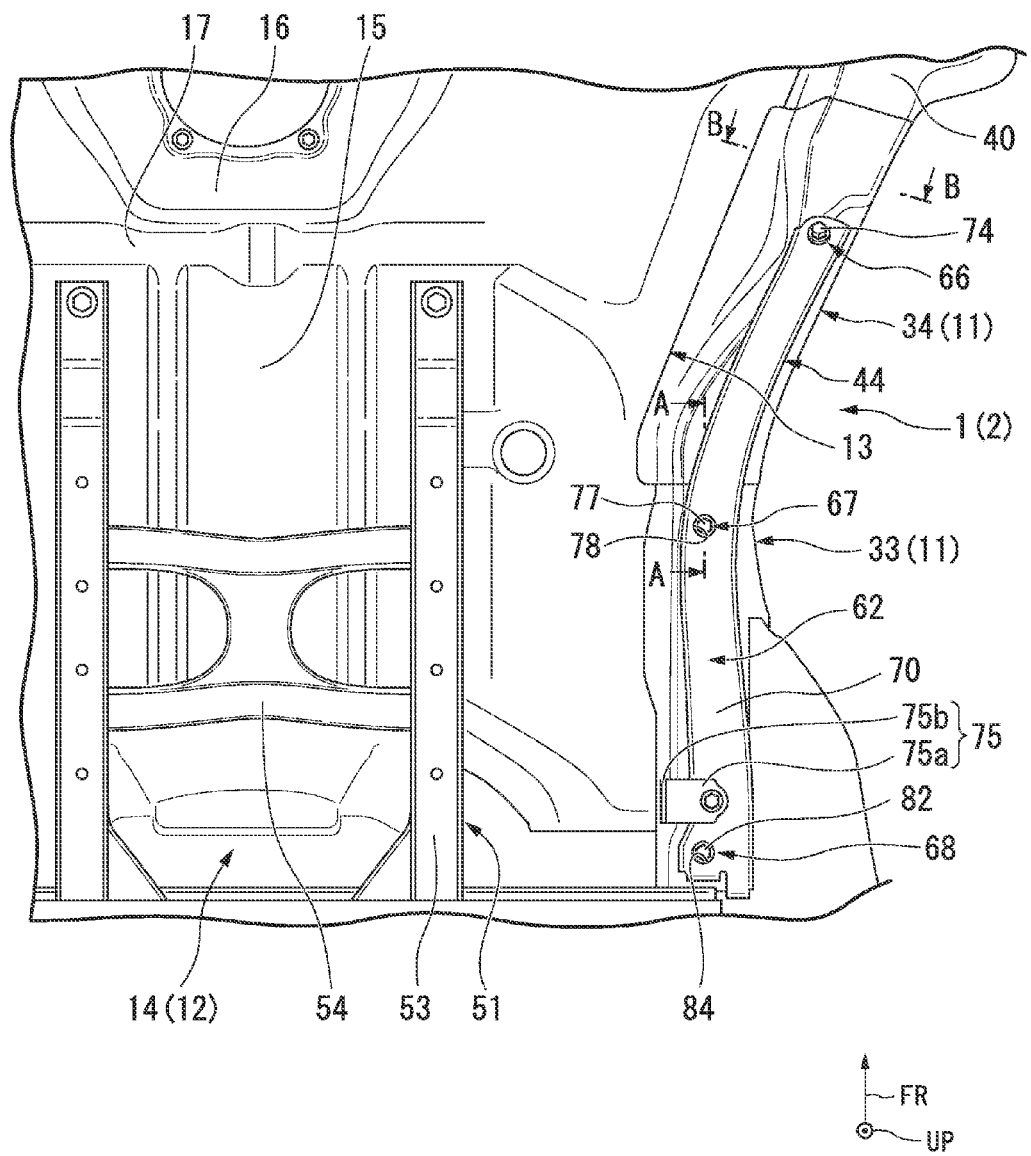
FIG. 2 is a plan view of the vehicle body rear structure illustrating a state where a battery, an IPU, a rear seat, and the like are detached.

As illustrated in FIGS. 1 and 2, a rear structure (a vehicle body rear structure) 2 of a vehicle body 1 in this embodiment includes a pair of left and right rear frames 11, which extend along the forward and rearward direction, a spare tire pan 12 which is disposed between the rear frames 11 and accommodates a spare tire (not shown), and a rear floor 13 which is connected to the front end edge of the spare tire pan 12 and forms a rear floor surface of the vehicle body 1.

Both end portions in the vehicle width direction of the spare tire pan 12 are connected to the rear frames 11. In addition, a tire accommodation portion 14 which is recessed is provided in the lower portion of the substantially central portion of the spare tire pan 12, and the spare tire (not shown) is accommodated in the tire accommodation portion 14.

As illustrated in FIG. 2, both end portions in the vehicle width direction of the rear floor 13 are connected to the rear frames 11, and the rear end portion thereof is connected to the front end portion of the spare tire pan 12. Specifically, the rear floor 13 includes an upper stepped portion 15 that is formed in a stepped shape in the forward and rearward direction between the rear frames 11 and extends forward from the front end portion of the spare tire pan 12, a tilted portion 17 that is tilted downward as it goes forward from the front end edge of the upper stepped portion 15, and a lower stepped portion 16 that extends forward from the front end edge of the tilted portion 17.

As illustrated in FIG. 1, in a part of the rear floor 13 along the forward and rearward direction where the upper stepped portion 15 is positioned, a substantially arc-shaped damper housing 21 is provided on the outside in the vehicle width direction with respect to each of the rear frames 11 so as to cover the upper half portion of the outer periphery of the left and right rear wheels (not shown), and the lower edge of the damper housing 21 is joined to each of the corresponding rear frames 11.

In addition, above the lower stepped portion 16 and the tilted portion 17 in the rear floor 13, a plurality of rear seats 22 are installed to be lined up in the vehicle width direction. Each of the rear seats 22 has a seat cushion 23a (see FIG. 7) and a seat back 23b to divide the vehicle interior and the luggage space.

Figure 3:
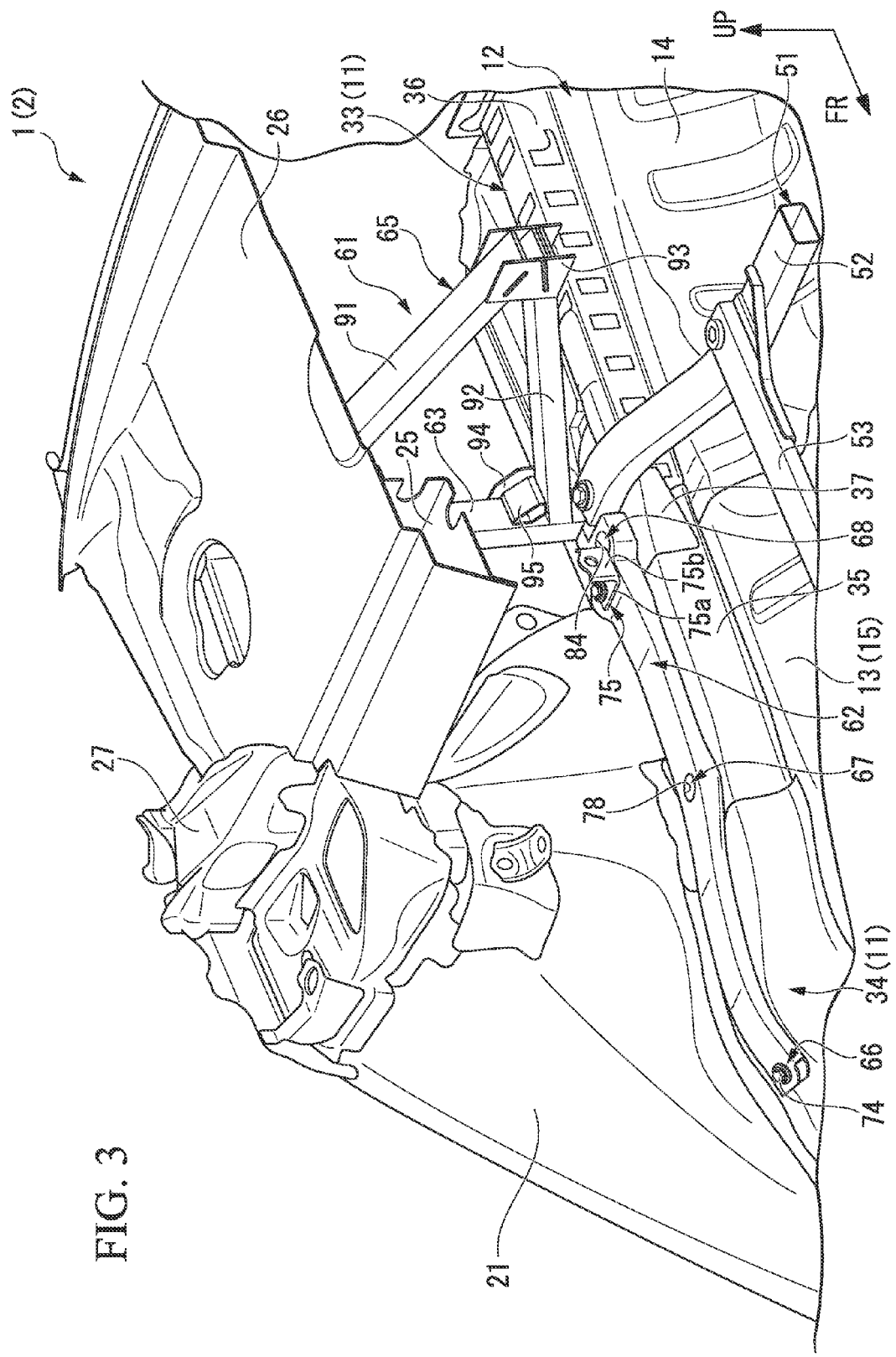
FIG. 3 is a perspective cross-sectional view of the vehicle body rear structure illustrating the state where the rear seat, the IPU, the battery, and the like are detached as viewed from a forward and upwardly tilted direction.

FIG. 3 is a perspective cross-sectional view of the vehicle body rear structure illustrating the state where the rear seats and the IPU are detached as viewed from the forward and upwardly tilted direction.

As illustrated in FIGS. 1 and 3, to the rear of the upper part of the seat back 23b, a parcel cross member 25 (see FIG. 3) that extends along the vehicle width direction is provided. The parcel cross member 25 is fixed to each of the corresponding upper portions of the damper housing 21 at both end portions in the vehicle width direction. In addition, a rear parcel shelf 26 that has a closed cross-sectional structure with the parcel cross member 25 is provided on the parcel cross member 25. The rear parcel shelf 26 is disposed so that the vertical direction thereof is the thickness direction and extends further rearward than the rear end portion of the parcel cross member 25. In addition, reinforcing members 27 are provided on both end portions of the rear parcel shelf 26. The reinforcing members 27 are connected to the rear parcel shelf 26 so as to communicate with the closed cross-section of the parcel cross member 25 and the rear parcel shelf 26. In addition, reference numeral 29 illustrated in FIG. 6 denotes a connection wall 29 that connects the rear portions of the reinforcing member 27 and the parcel cross member 25 to each other.

Figure 4:
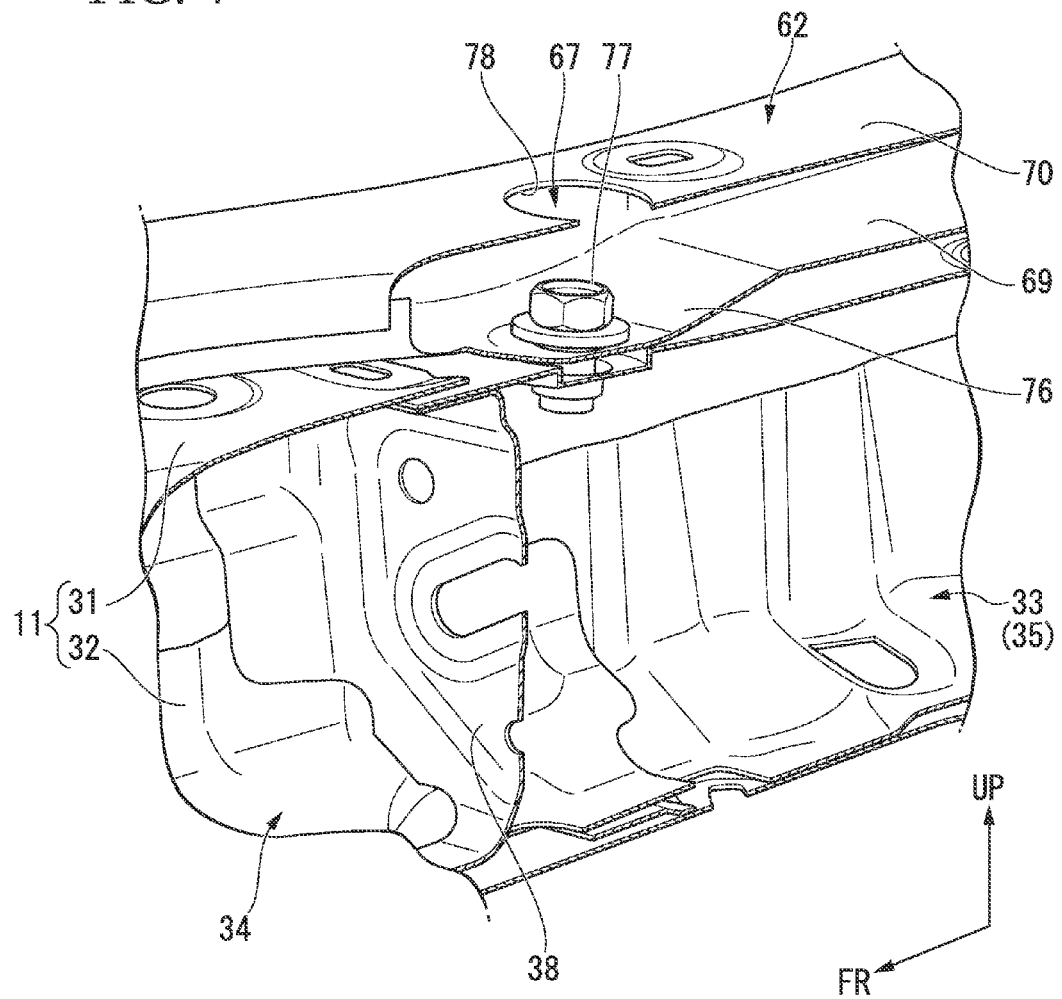
FIG. 4 is a cross-sectional view taken along the line A-A of FIG. 2.

FIG. 4 is a cross-sectional view taken along the line A-A of FIG. 2.

As illustrated in FIGS. 3 and 4, the rear frame 11 includes an upper rear frame 31 and a lower rear frame 32 bonded in the vertical direction, has a rectangular closed cross-sectional structure in a cross-sectional view, and extends along the forward and rearward direction. Specifically, the rear frames 11 have rearward extension portions 33 that extend along the forward and rearward direction on both sides of the spare tire pan 12 and the upper stepped portion 15 of the rear floor 13, and a kick-up portion 34 that extends while being curved downward and outward in the vehicle width direction as it goes forward from the front end of the rearward extension portion 33.

The inner end portion along the vehicle width direction of the rearward extension portion 33 is connected to each of the outer end portions along the vehicle width direction of the spare tire pan 12 and the upper stepped portion 15 of the rear floor 13. In addition, the front portion (a connection part to the rear floor 13) of the rearward extension portion 33 constitutes a high strength portion 35 which is formed to have a higher strength than the rear portion thereof (a connection part to the spare tire pan 12), and the rear portion thereof constitutes a low strength portion 36 for absorbing an input load F by impelling buckling deformation during a rear collision. In addition, in the rearward extension portion 33, a gusset 37 that covers the boundary part from above is bonded to the boundary part between the high strength portion 35 and the low strength portion 36.

In addition, in the rear frame 11, a bulk head 38 is disposed at the boundary part between the kick-up portion 34 and the rearward extension portion 33. The bulk head 38 is disposed to block the inside of the rear frame 11 in the forward and rearward direction, and the outer peripheral edge thereof is bonded to the inner surface of the rear frame 11.

Figure 5:
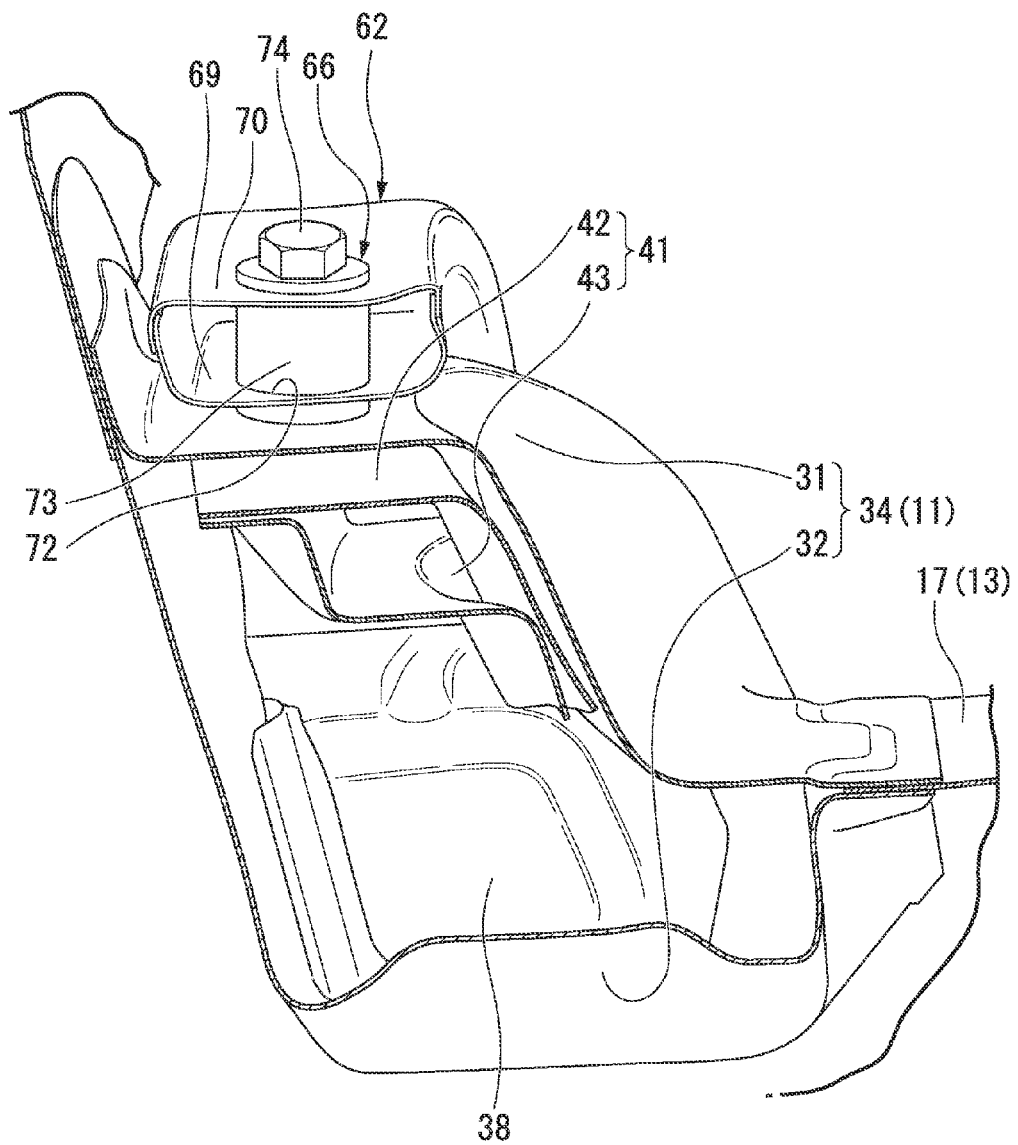
FIG. 5 is a cross-sectional view taken along the line B-B of FIG. 2.
Figure 5:
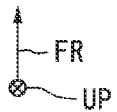

FIG. 5 is a cross-sectional view taken along the line B-B of FIG. 2.

As illustrated in FIGS. 2 and 5, the front end portions of the kick-up portions 34 are respectively connected to left and right side sills 40 which are vehicle body frame members. In addition, in the front end portion in each of the kick-up portions 34, a reinforcing frame 41 is disposed over the inside of the kick-up portion 34 and the inside of the side sill 40. The reinforcing frame 41 has a closed cross-sectional structure with a stiffener 42 and a reinforcing member 43 that covers the stiffener 42 from below. In addition, as the upper surface of the stiffener 42 is bonded to the inner surface of the upper rear frame 31 in the kick-up portion 34, the reinforcing frame 41 is disposed inside the kick-up portion 34.

Figure 6:
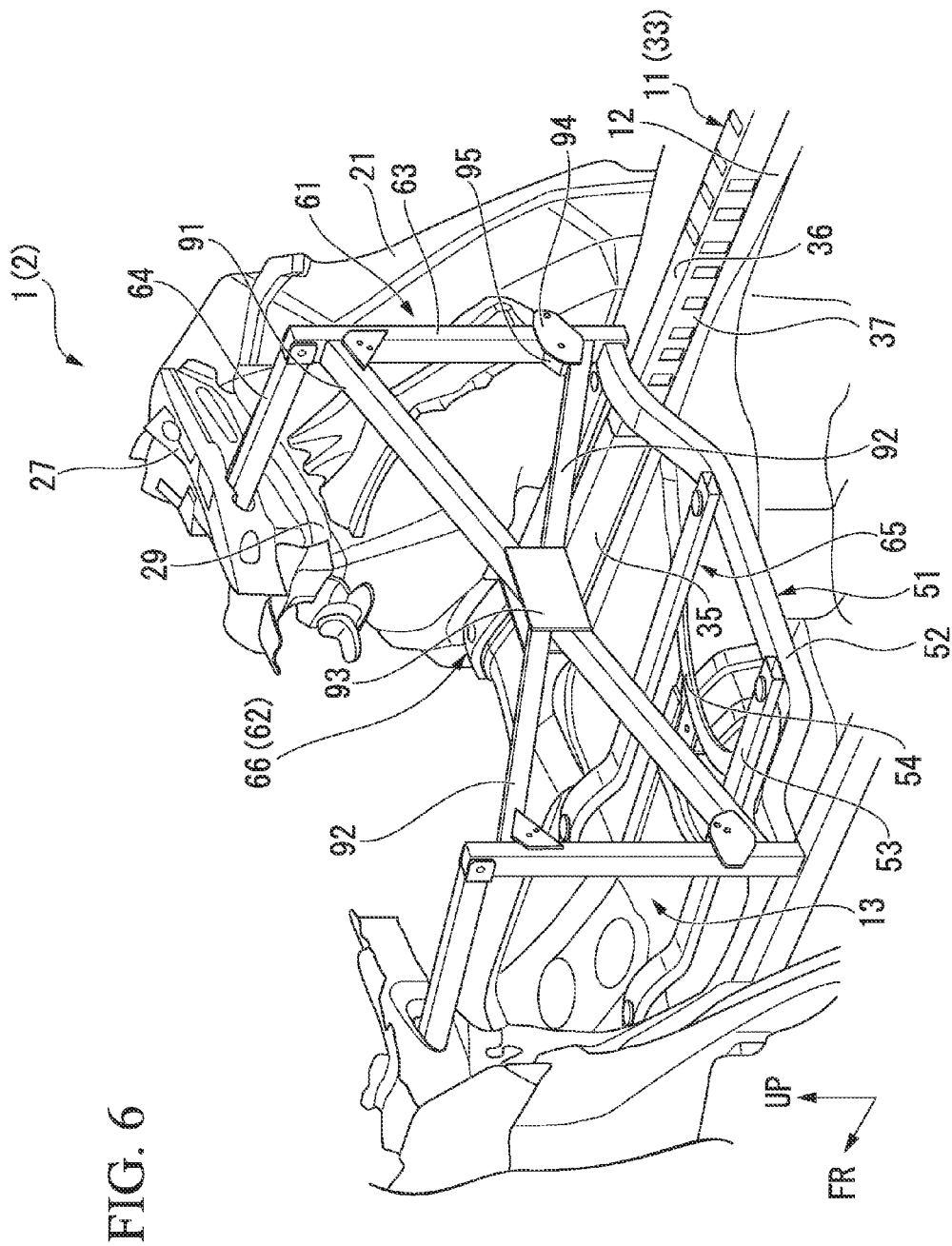
FIG. 6 is a perspective view of the vehicle body rear structure illustrating a state in which the battery, the IPU, a rear parcel shelf, and the like are detached, as viewed from the rearward and upwardly tilted direction.

However, as illustrated in FIGS. 3 and 6, to the rear of the rear seat 22, an IPU mounting frame (a mounting frame) 51 for mounting an IPU 3 is provided. The IPU mounting frame 51 includes a horizontal frame 52 that bridges between the rear frames 11, and a pair of front and rear frames 53, which extend forward from the horizontal frame 52.

The horizontal frame 52 is a member that has a continuously closed cross-sectional structure along the left and right direction, is disposed to cause the center portion thereof in the vehicle width direction to be disposed at a lower position than those of both end portions thereof, and is gradually tilted downward as it goes to the center portion from both end portions thereof. Both end portions of the horizontal frame 52 is fixed to the gussets 37 on the rear frames 11.

As illustrated in FIG. 2, each of the front and rear frames 53 is a member that has a continuously closed cross-sectional structure along the forward and rearward direction, the rear end portions thereof are fixed to the center portion of the horizontal frame 52 at an interval in the vehicle width direction, and the front end portions thereof are fixed on the front end portion side of the rear floors 13. In addition, at the center portion in the forward and rearward direction of each of the front and rear frames 53, a reinforcing member 54 that bridges between the front and rear frames 53 is provided.

Here, as illustrated in FIGS. 1 and 2, the IPU 3 described above supplies power to an electric motor (electric motor for travelling) (not shown) and stores power generated by the electric motor by causing the electric motor to function as a generator during deceleration regeneration. The IPU 3 includes a box-shaped casing 4 in which a battery, a high-voltage device, and the like are accommodated, and the casing 4 is accommodated in a space positioned to the rear of the seat back 23b described above and below the rear parcel shelf 26. In addition, the bottom wall of the IPU 3 is fixed to the front and rear frames 53 of the IPU mounting frame 51, and the side walls thereof are fixed to an IPU attaching portion (an attaching portion) 75 of a lower horizontal member (a reinforcing bar) 62 described later, such that the IPU 3 is supported at least from the below and side. In this case, the lower portion of the rear wall of the IPU 3 (casing 4) is disposed at a position that overlaps both end portions of the horizontal frame 52 described above in the forward and rearward direction. In addition, a gap is formed between the top wall of the casing 4 and the lower surface of the rear parcel shelf 26 (the parcel cross member 25).

Cooling air ducts 55 through which cooling air for cooling the battery and the like in the casing 4 is circulated are connected to both side walls along the vehicle width direction of the casing 4. The cooling air ducts 55 include inner ducts 55a that extend upward as they goes outward in the vehicle width direction from the side walls of the casing 4, and outer ducts 55b that are connected to the inner ducts 55a via fans 56, and extend downward and then are open downward.

FIG. 6 is a perspective view of the vehicle body rear structure illustrating the state in which the IPU, the rear parcel shelf, and the like are detached as viewed from the rearward and upwardly tilted direction.

As illustrated in FIGS. 1, 3, and 6, to the rear of the IPU 3 and on the inside of the outer ducts 55b described above, an IPU protection guard (protection guard) 61 that surrounds the IPU 3 from the rear thereof is provided. The IPU protection guard 61 includes lower horizontal members 62 that extend on both sides of the lower portion of the IPU 3, following the upper surfaces of the rear frames 11, vertical members 63 that are provided to stand up from the rear end portions of the lower horizontal members 62, upper horizontal members 64 that extend forward from the upper end portions of the vertical members 63, and an X-shaped member 65 that bridges between the vertical members 63 along the rear surface of the IPU 3.

As illustrated in FIGS. 2, 4, and 5, the lower horizontal member 62 is made of a steel pipe having a lower member 69 and an upper member 70 formed by press forming and bonded in the vertical direction, and has a rectangular closed cross-sectional structure in the cross-sectional view. The lower horizontal member 62 is disposed on the rear frame 11 so that the rear end portion thereof is positioned at the boundary part (the rear end position of the IPU 3) between the higher strength portion 35 and the lower strength portion 36 on the rearward extension portion 33 of the rear frame 11 and the front end portion thereof is positioned on the kick-up portion 34. That is, the front portion of the lower horizontal member 62 extends while being curved downward and outward in the vehicle width direction as it goes forward, following the shape of the upper surface of the rear frame 11.

In addition, the lower horizontal member 62 is fixed to the rear frame 11 at three points of a front end fastening portion 66 fixed to the kick-up portion 34, an intermediate fastening portion 67 fixed to the front end portion of the high strength portion 35 in the rearward extension portion 33, and a rear end fastening portion (a fastening portion) 68 fixed to the rear end portion of the high strength portion 35.

Figure 7:
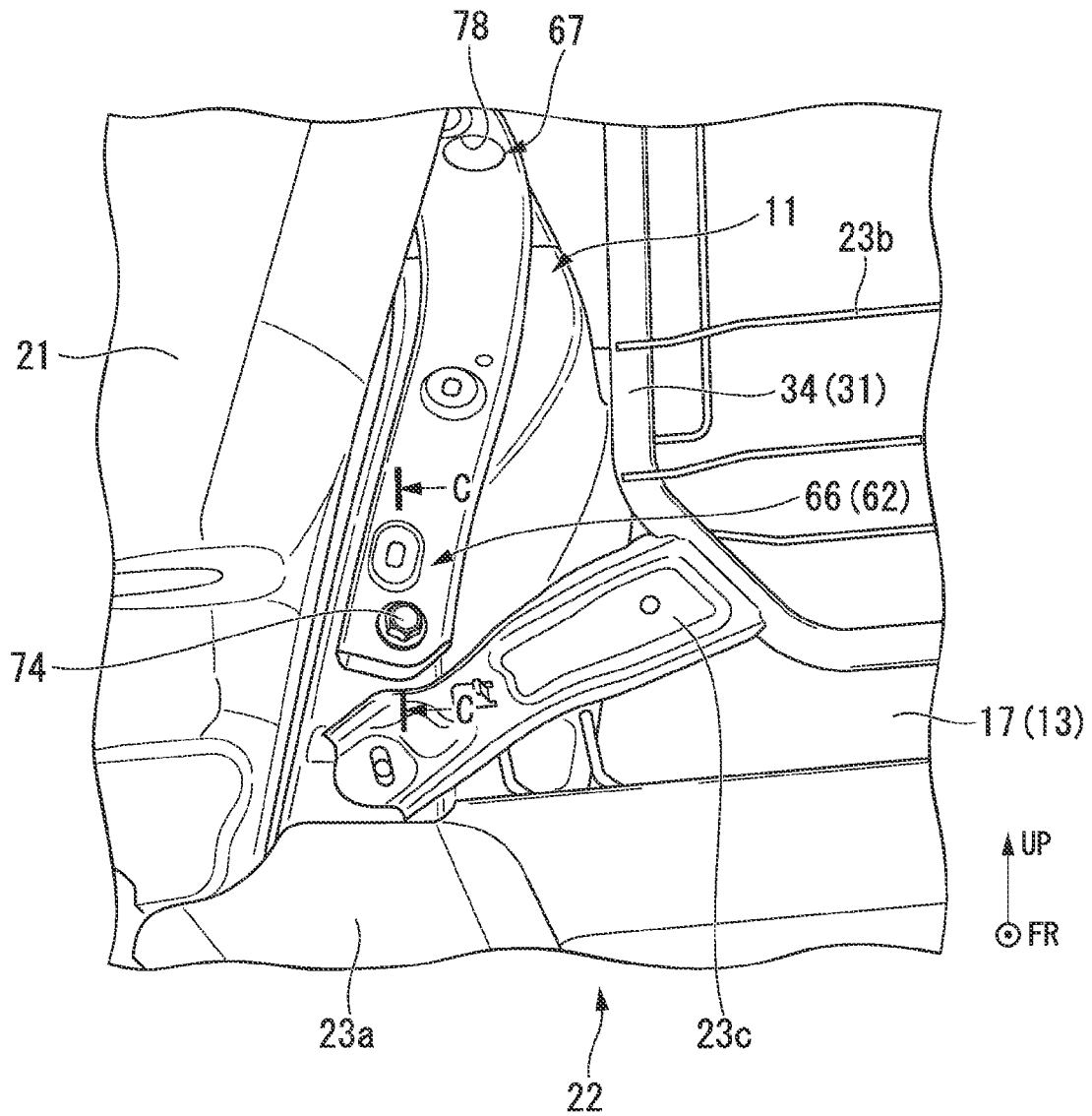
FIG. 7 is a plan view of the vehicle body rear structure illustrating a front end fastening portion.
Figure 8:
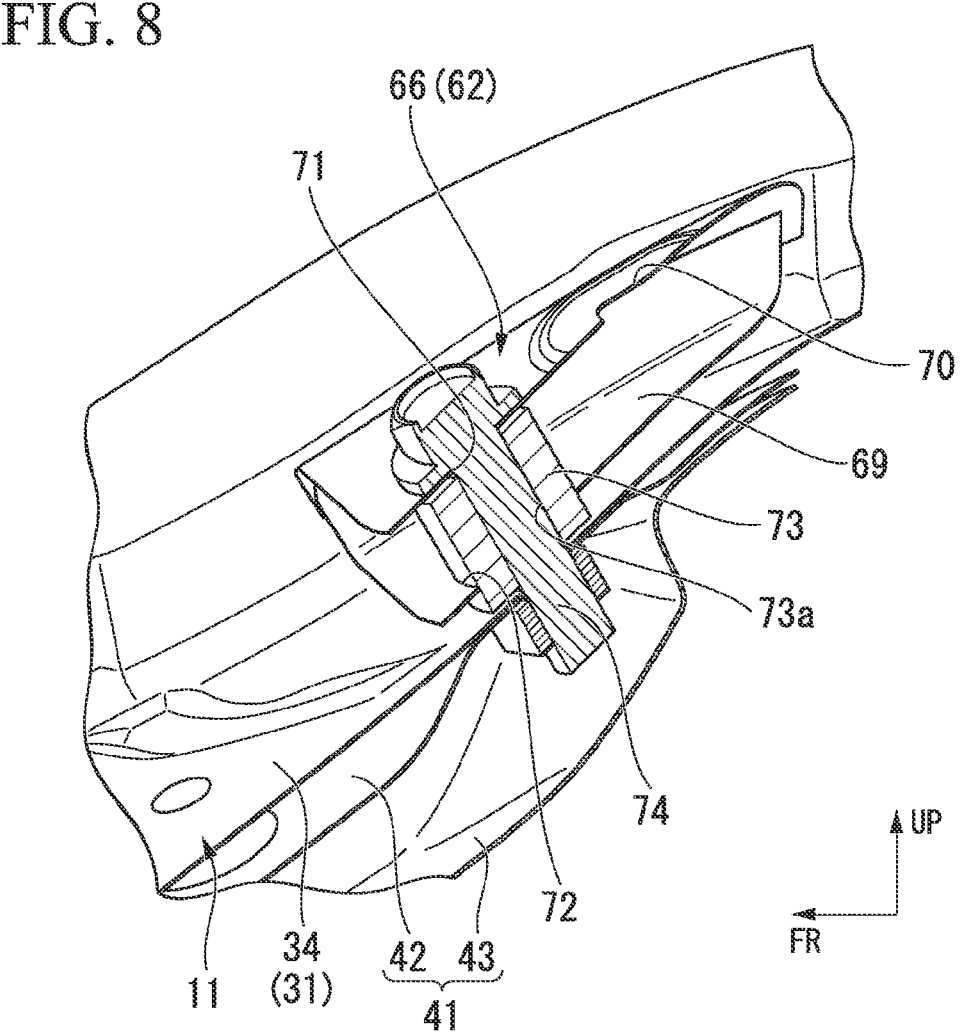
FIG. 8 is a cross-sectional view taken along the line C-C of FIG. 7.

FIG. 7 is a plan view of the vehicle body rear structure illustrating the front end fastening portion, and FIG. 8 is a cross-sectional view taken along the line C-C of FIG. 7.

As illustrated in FIGS. 3, 5, 7, and 8, the front end fastening portion 66 of the lower horizontal member 62 is disposed in the vicinity of a fixing portion 23c (in the embodiment, to the rear of the fixing portion 23c) of the seat back 23b (a seat back frame of the seat back 23b is illustrated in FIG. 7) on the kick-up portion 34. In the front end fastening portion 66, through-holes 71 and 72 are formed in the lower member 69 and the upper member 70 at positions that overlap each other as viewed from the above. In addition, in the front end fastening portion 66, a cylindrical collar 73 having an insertion hole 73a at a position that overlaps the through-holes 71 and 72 is disposed. The collar 73 is held in the front end fastening portion 66 in a state in which the upper end portion thereof abuts the lower surface of the upper member 70 and the lower end portion thereof protrudes downward from the lower member 69 through the through-hole 72. Therefore, the front end fastening portion 66 is disposed in a state where the lower surface of the collar 73 abuts the kick-up portion 34.

In addition, a fastening member 74 is inserted from the upper member 70 side so as to penetrate through the through-holes 71 and 72 of the front end fastening portion 66 and the insertion hole 73a of the collar 73. The fastening member 74 is fastened to the stiffener 42 described above as the head portion thereof abuts the upper surface of the upper member 70 and the tip end portion thereof penetrates through the kick-up portion 34 described above.

As illustrated in FIGS. 2 to 4, the intermediate fastening portion 67 is disposed in the vicinity of the bulk head 38 (in the embodiment, to the rear of the bulk head 38) inside the rear frame 11 in the lower horizontal member 62. On the lower member 69 side in the intermediate fastening portion 67, a pedestal portion 76 that is swollen in the downward direction is formed. The lower surface of the pedestal portion 76 abuts the upper surface of the rearward extension portion 33 described above. In addition, the lower member 69 in the pedestal portion 76 is provided with a through-hole (not shown) through which a fastening member 77 is inserted, and the upper member 70 therein is provided with an operation hole 78 having a larger diameter than that of the fastening member 77 at a position that overlaps the through-hole in the vertical direction.

The head portion of the fastening member 77 abuts the upper surface of the pedestal portion 76, and the tip end portion thereof is fastened to the rear frame 11 to the rear of the bulk head 38.

Figure 9:
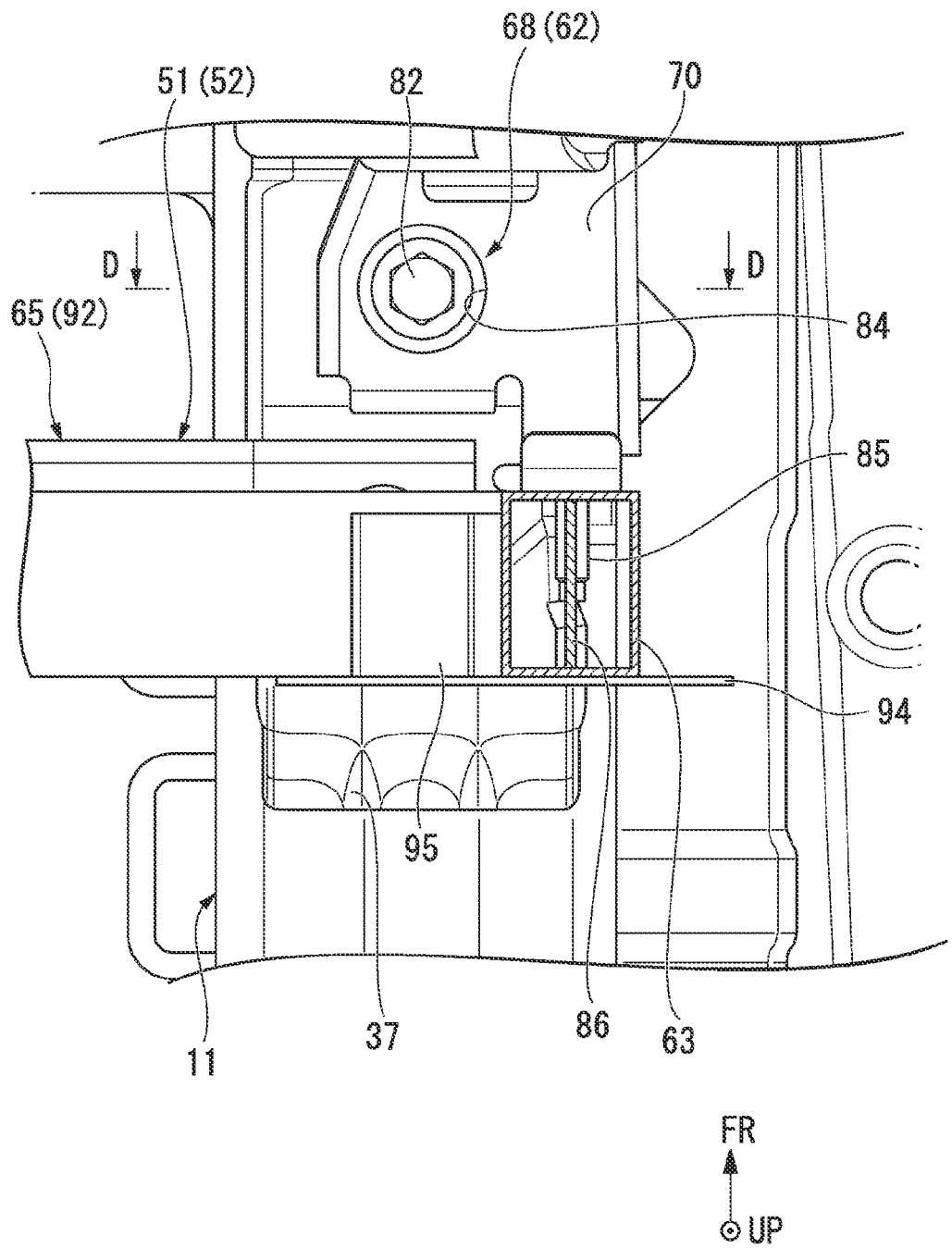
FIG. 9 is a plan view of the vehicle body fastening structure illustrating a rear end fastening portion.
Figure 10:
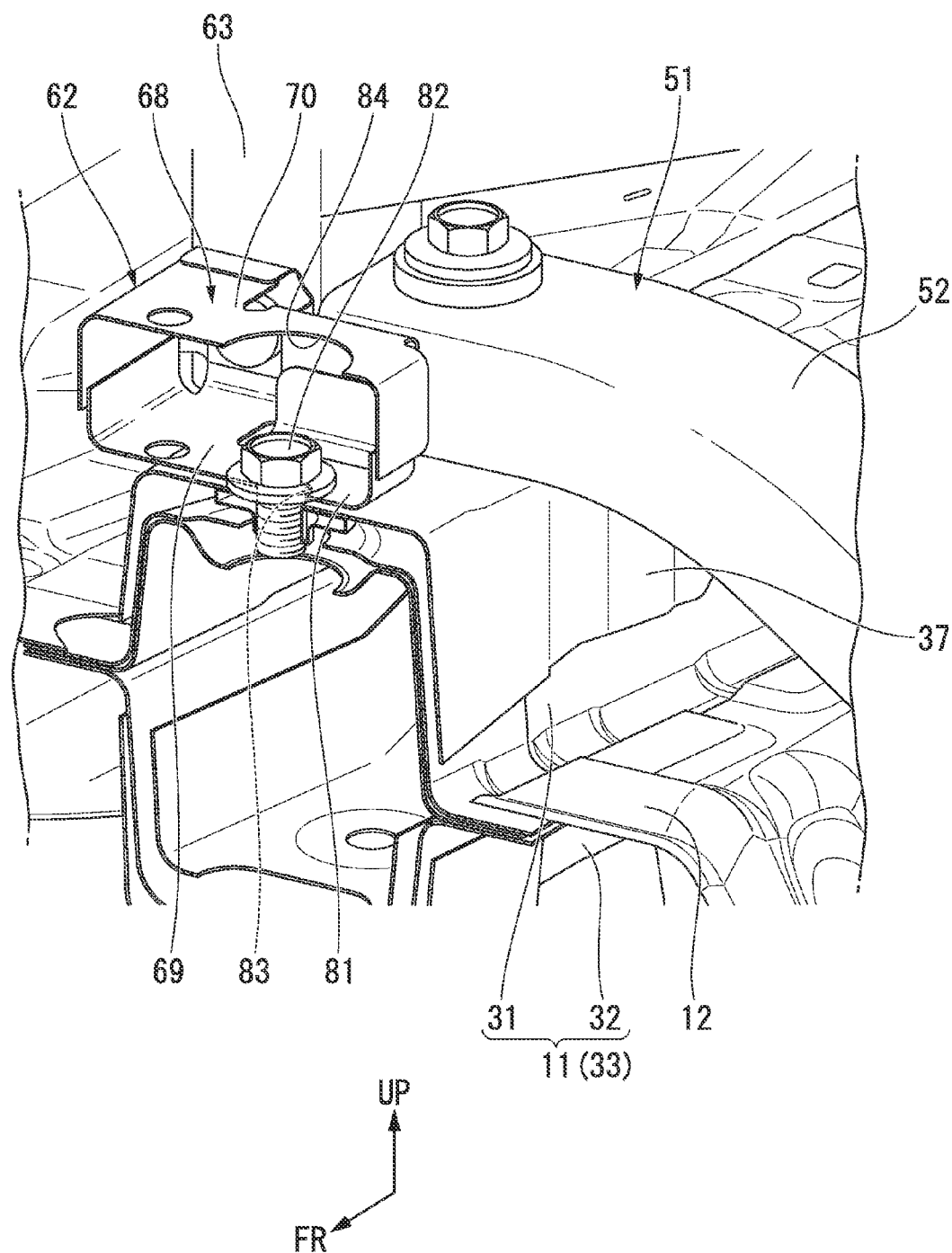
FIG. 10 is a cross-sectional view taken along the line D-D of FIG. 9.

FIG. 9 is a plan view of a vehicle fastening structure illustrating the rear end fastening portion. FIG. 10 is a cross-sectional view taken along the line D-D of FIG. 9.

As illustrated in FIGS. 2, 9, and 10, the rear end fastening portion 68 is disposed at the boundary part (the point where the gusset 37 is disposed) between the low strength portion 36 and the high strength portion 35 of the rear frame 11 described above, and specifically, at the same position as the rear end portion of the IPU 3, and increases in width inward in the vehicle width direction as it goes rearward. In addition, on the lower member 69 side in the rear end fastening portion 68, a pedestal portion 81 that is swollen in the downward direction similarly to the intermediate fastening portion 67 described above is formed. That is, the lower horizontal member 62 is caused to abut the upper surface of the rear frame 11 by the collar 73 and each of the pedestal portions 76 and 81 described above, and accordingly, a gap is formed between the lower surface of the lower member 69 and the rear frame 11 in the vertical direction in parts other than each of the fastening portions 66 to 68. In addition, the rear end fastening portion 68 may be disposed closer to the forward side or rearward side than the rear end position of the IPU 3 as long as it is in the vicinity of the IPU 3.

In addition, the pedestal portion 81 in the lower member 69 is provided with a through-hole 83 through which a fastening member 82 is inserted, and the upper member 70 is provided with an operation hole 84 having a larger diameter than that of the fastening member 82 at a position that overlaps the through-hole 83 in the vertical direction.

The head portion of fastening member 82 abuts the upper surface of the pedestal portion 81, and the tip end portion thereof is fastened to the rear frame 11 at the boundary part between the high strength portion 35 and the rear strength portion 36. In addition, the rear end portion of the lower horizontal member 62 is blocked as the lower member 69 and the upper member 70 are bonded in the vertical direction.

In addition, in the lower horizontal member 62, at a part positioned in front of the rear end fastening portion 68, the IPU attaching portion (attaching portion) 75 is provide. The IPU attaching portion 75 is for fixing the lower horizontal member 62 to the IPU 3 and is formed in an L shape as viewed from the front. Specifically, the IPU attaching portion 75 includes a horizontal angle 75a fixed to the upper surface of the lower horizontal member 62, and a vertical angle 75b that extends upward from the inner end portion in the vehicle width direction of the horizontal angle 75a and is fixed to the side wall of the IPU 3 via a fastening member (not shown).

Figure 11:
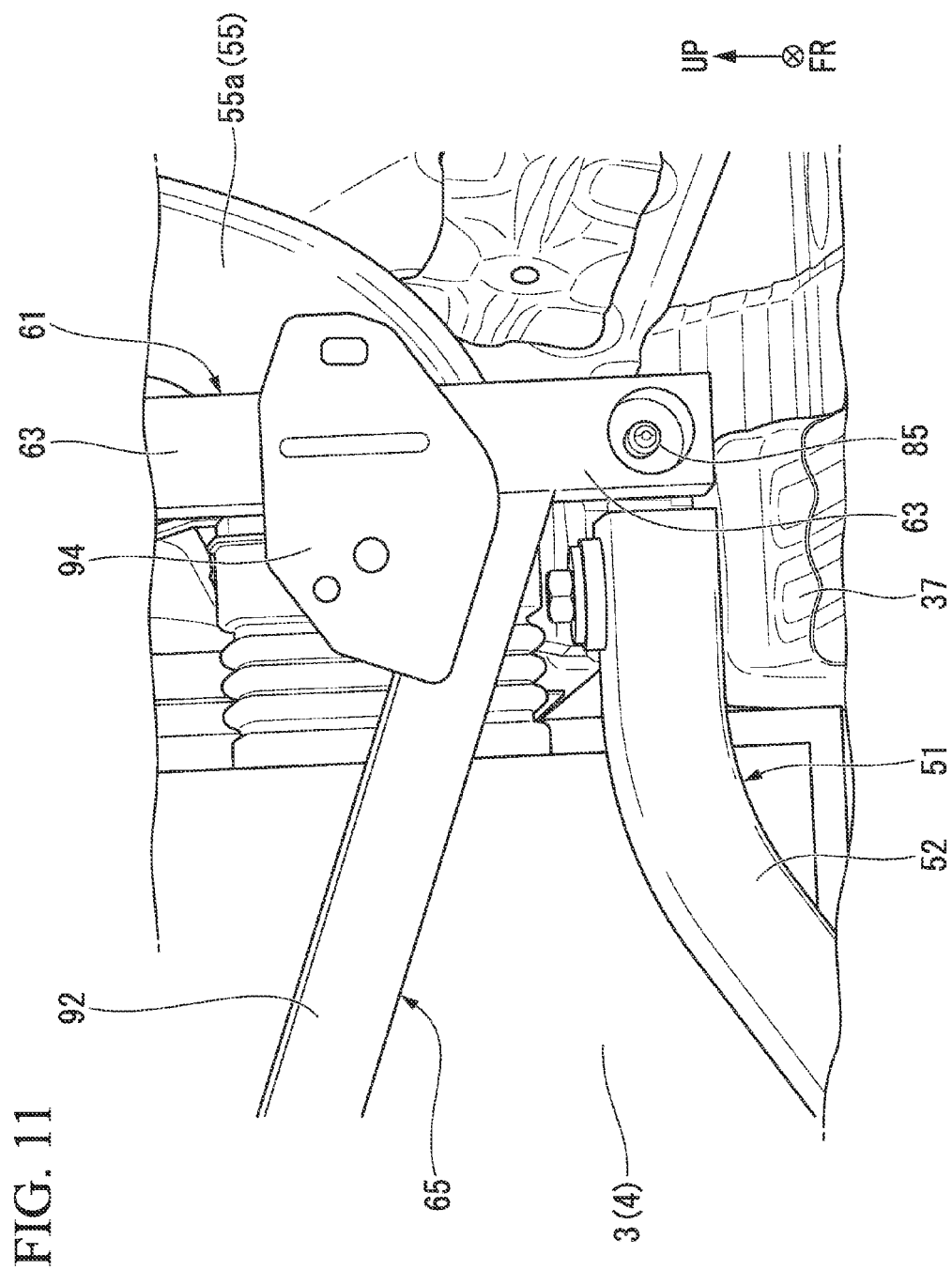
FIG. 11 is a diagram of the vehicle body rear structure illustrating a vertical member as viewed from the rear.

FIG. 11 is a diagram of the vehicle body rear structure illustrating the vertical member as viewed from the rear.

As illustrated in FIGS. 6, 9, and 11, the vertical member 63 is a member that is formed by extrusion molding of an aluminum alloy to have a continuously closed cross-sectional structure in the vertical direction, and the rear end portion thereof is fastened to the rear end surface of the rear end fastening portion 68 in the lower horizontal member 62 described above by a fastening member 85 such as a stud bolt. In addition, in the vertical member 63, a rib 86 (see FIG. 9) that divides the internal portion thereof in the left and right direction is provided.

As illustrated in FIG. 6, the upper horizontal member 64 made of a steel pipe or the like having a continuously closed cross-sectional structure along the forward and rearward direction, and extends outward in the vehicle width direction on both sides of the upper portion of the IPU 3 described above as it goes forward along the lower surface of the rear parcel shelf 26. Therefore, each of the horizontal members 62 and 64 extends outward in the vehicle width direction from the position that avoids the outer duct 55b described above on the inside as it goes forward. The rear end portion of the upper horizontal member 64 is fastened to the upper end portion of the vertical member 63 by a fastening member (not shown) such as a bolt, and the front end portion thereof penetrates through the connection wall 29 described above and is fixed to the reinforcing member 27.

Figure 12:
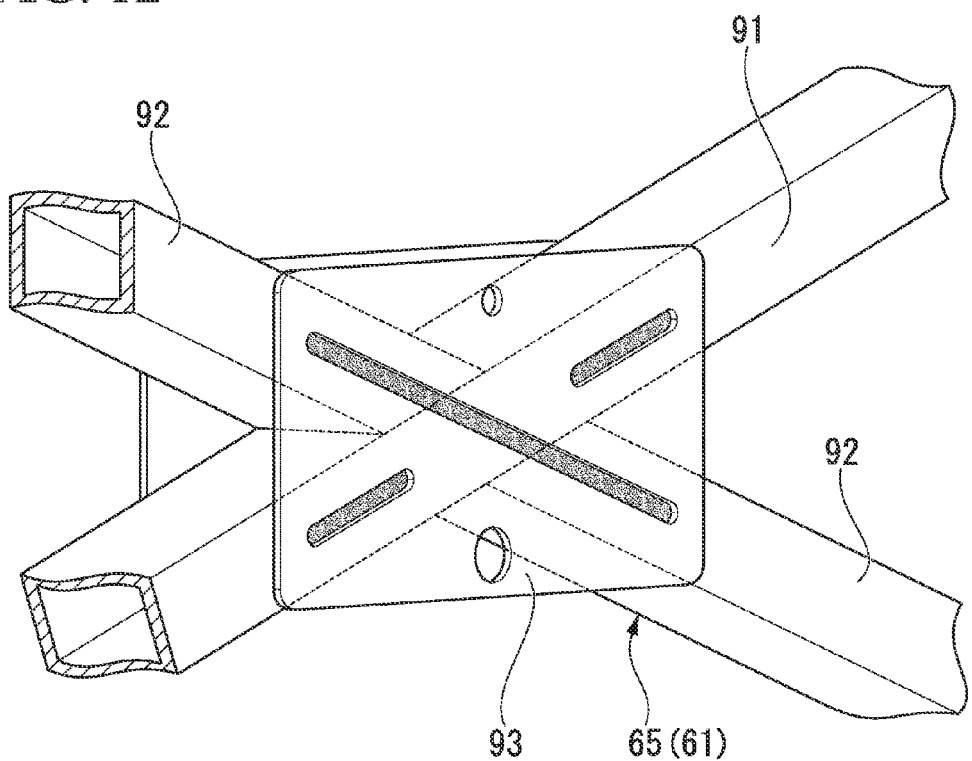
FIG. 12 is a perspective view illustrating the intersection part between a first member and a second member.

FIG. 12 is a perspective view illustrating the intersection part between a first member and a second member.

As illustrated in FIGS. 6 and 12, the X-shaped member 65 is configured so that a first member 91, which connects the upper end portion of the vertical member 63 on one side along the vehicle width direction to the lower end portion of the vertical member 63 on the other side, and a second member 92, which connects the upper end portion of the vertical member 63 on the other side to the lower end portion of the vertical member 63 on the one side, bridge between the vertical members 63 on the diagonal lines.

The first member 91 is a member that has a closed cross-sectional structure formed by aluminum extrusion molding or the like, the left end portion thereof along the vertical width direction is connected to the upper end portion of the vertical member 63 on the one side, and the left end portion thereof is connected to the lower end portion of the vertical member on the other side.

The second member 92 is a member that has a closed cross-sectional structure formed by aluminum extrusion molding or the like similarly to the first member 91 and is divided into two parts by the first member 91 interposed therebetween. Specifically, the left end portion in the vehicle width direction of the one second member 92 is connected to the upper end portion of the vertical member 63 on the other side, and the right end portion thereof is connected to the center portion in the extension direction of the first member 91. In addition, the right end portion in the vehicle width direction of the one other second member 92 is connected to the lower end portion of the vertical member 63 on the one side, and the left end portion thereof is connected to the center portion in the extension direction of the first member 91.

In addition, at the intersection part between the first member 91 and the second member 92, that is, at the center portion in the extension direction of the first member 91, a pair of connection plates 93 that interpose the intersection part in the forward and rearward direction is provided. The opposing surfaces of the connection plates 93 are bonded to the first member 91 and the second member 92 by mig welding or the like. That is, the first member 91 and the second member 92 connected to each other via the connection plates 93.

Figure 13:
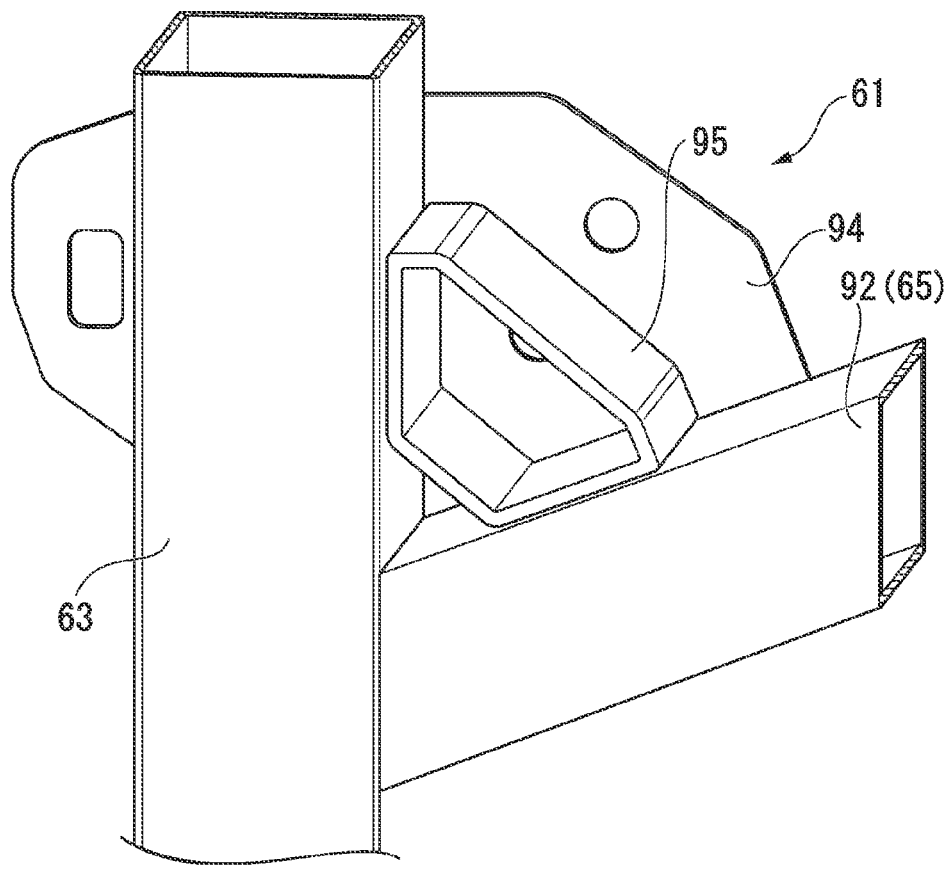
FIG. 13 is a perspective view of the connection part between the second member and the vertical member as viewed from the front.

FIG. 13 is a perspective view of the connection part between the first member and the vertical member as viewed from the front.

In addition, for example, as illustrated in FIGS. 11 and 13, to the connection part between the second member 92 and the vertical member 63, a corner plate 94 is bonded from the rear. The front surfaces of the corner plates 94 are bonded to the second member 92 and the vertical member 63 by mig welding or the like. That is, the second member 92 and the vertical member 63 are connected to each other via the corner plate 94.

Moreover, on the front surface of the corner plate 94, inside a corner which is formed by the extension direction of the second member 92 and the extension direction of the vertical member 63, a corner member 95 which bonds the second member 92, the vertical member 63, and the corner plate 94 is provided. The corner members 95 are formed in an angular tube shape, and the rear end part thereof is bonded to the corner plate 94. In addition, in FIGS. 11 and 13, the connection part between the second member 92 and the vertical member 63 on the one side is illustrated, and the connection parts between the first member 91 and the second member 92, and the vertical member 63 have the same configuration.

Figure 14:
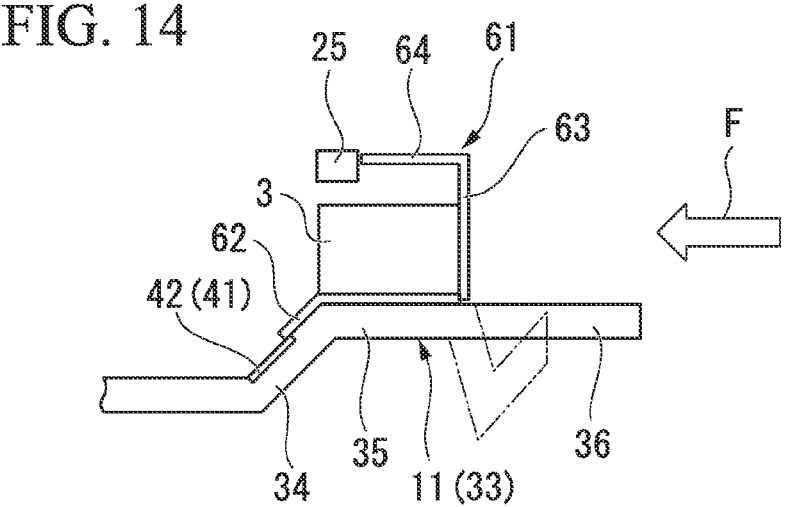
FIG. 14 is a schematic configuration diagram of the vehicle body rear structure as viewed from the side.

Next, actions of the vehicle body rear structure of this embodiment will be described. FIG. 14 is a schematic configuration diagram of the vehicle body rear structure as viewed from the side, and FIG. 15 is a perspective view of the IPU protection guard as viewed from the rearward and upwardly tilted direction.

First, as illustrated in FIG. 14, during a rear collision, when an input load F is exerted forward on the rear end of each of the rear frames 11 in the vehicle body 1, the low strength portion 36 of the rear frame 11 starts buckling deformation. Here, the high strength portion 35 of the front portion of the rear frame 11 is formed to have a higher strength than the low strength portion 36 of the rear portion thereof, and thus only the low strength portion 36 undergoes buckling portion to effectively absorb the input load F.

In particular, the lower horizontal member 62 of the IPU protection guard 61 is fixed to the front side of the rear frame 11, and specifically, the kick-up portion 34 and the high strength portion 35 at the three points of the front end fastening portion 66, the intermediate fastening portion 67, and the rear end fastening portion 68. Therefore, bending of the boundary part between the kick-up portion 34 and the high strength portion 35 is suppressed, thereby suppressing the rear frame 11 from being raised upward.

Figure 15:
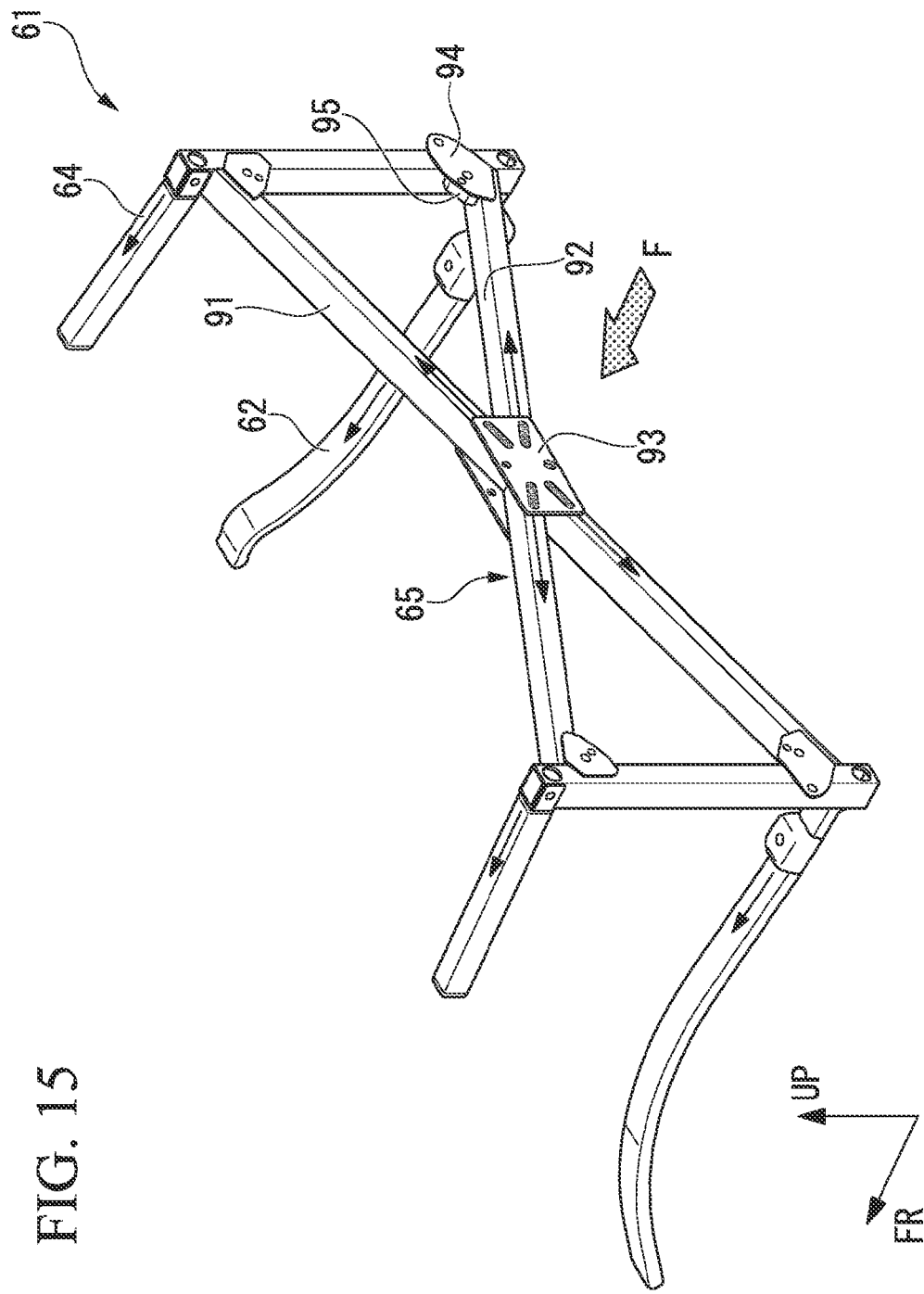
FIG. 15 is a perspective view of a battery protection guard (IPU protection guard) as viewed from a rearward and upwardly tilted direction.
Figure 16:
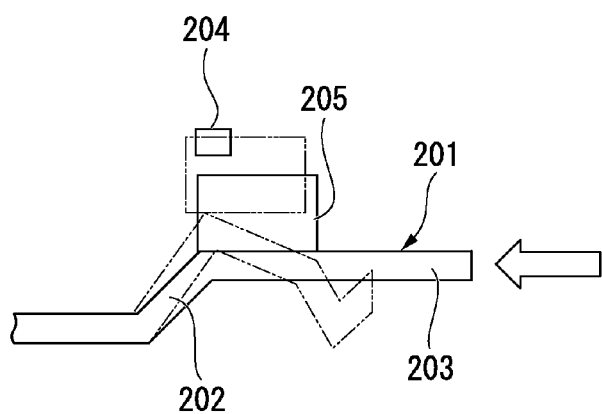
FIG. 16 is a schematic configuration diagram of a vehicle body rear structure according to the related art as viewed from the side.

In addition, as illustrated in FIG. 15, when the input load F is transmitted to the IPU protection guard 61, the input load F is transmitted outward in the vehicle width direction from the intersection part (connection plate 93) of the X-shaped member 65 via the first member 91 and the second member 92 (see the arrow in FIG. 15). That is, the direction of the input load F exerted forward on the intersection part of the X-shaped member 65 is changed and is exerted outward in the vehicle width direction.

Thereafter, the input load F is exerted on each of the lower horizontal member 62 and the upper horizontal member 64 at the outer end portions of the first member 91 and the second member 92 and is thereafter transmitted forward via the lower horizontal member 62 and the upper horizontal member 64. That is, the direction of the input load F exerted outward in the vehicle width direction with respect to the first member 91 and the second member 92 is changed and is exerted forward.

In addition, the input load F is transmitted to the reinforcing member 27 at the front end portions of the first member 91 and the second member 92. Accordingly, the input load F transmitted to the IPU protection guard 61 is transmitted to the reinforcing member 27 by bypassing the IPU 3, thereby suppressing the input load F from being directly exerted on the IPU 3.

As such, in this embodiment, as described above, the input load F transmitted to the IPU protection guard 61 is transmitted to the reinforcing member 27 by bypassing the IPU 3, thereby suppressing the input load F from being directly exerted on the IPU 3.

In this case, there is no need for the IPU protection guard 61 to surround the entire periphery of the IPU 3, unlike the related art, and thus reductions in the number of components and in weight may be achieved. In addition, the IPU protection guard 61 is disposed on the rear surface of the IPU 3 only and the upper and lower portions on both sides in the vehicle width direction thereof, and thus the installation space of the IPU protection guard 61 may be suppressed. Accordingly, an increase in the size of the IPU 3 disposed on the inside of (in front of) the IPU protection guard 61 may be achieved.

As a result, reductions in the number of components and in weight and an increase in the size of the IPU 3 are achieved, and then the IPU 3 may be reliably protected.

In addition, since the X-shaped member 65 and the vertical member 63 are formed by extrusion molding of aluminum alloys, bending strength may be increased. In addition, since each of the horizontal members 62 and 64 is formed of a steel pipe, buckling strength may be increased. Therefore, the resistance to the input load F from the rear may be enhanced while achieving the reduction in weight. Accordingly, the IPU 3 may be protected more reliably.

Moreover, in this embodiment, both the upper and lower end portions of the vertical member 63 may be respectively fastened to the rear end portions of the upper and lower horizontal members 62 and 64, and thus the horizontal members 62 and 64 and the vertical members 63 may be separated in such units to be easily treated. Therefore, assembly characteristics in a case of assembling the IPU protection guard 61 into the luggage space may be enhanced.

Moreover, since the rib 86 that divides the internal portion of the vertical member 63 in the vehicle width direction is formed, the bending strength of the vertical member 63 may further be enhanced.

In addition, by connecting the X-shaped member 65 to the vertical member 63 with the corner plate 94 and the corner member 95, the bonding strength may be enhanced.

Moreover, since each of the upper horizontal member 64 and the lower horizontal member 62 extends outward in the vehicle width direction as it goes forward. Therefore, the internal space of the IPU protection guard 61, that is, the installation space of the IPU 3 may be enlarged after avoiding the cooling air ducts 55 and 56.

Moreover, in this embodiment, since the rear end portion of the lower horizontal member 62 is formed to increase in width, the IPU protection guard 61 and the rear end fastening portion 68 may be disposed at the rear end portion of the lower horizontal member 62 having the increased width, thereby enhancing layout characteristics of assembly.

Moreover, in the embodiment described above, designing of the shape of the IPU protection guard 61 may be appropriately changed as long as the horizontal members 62 and 64 and the X-shaped member 65 are included.

In addition, in the embodiment described above, the case where the corner plate 94 is bonded to the connection part between the vertical member 63 and the X-shaped member 65 from the rear is described. However, the embodiment is not limited thereto, and the corner plate 94 may be bonded from both forward and rearward sides and from the forward side.

As such, in this embodiment, as described above, since the rear frame 11 is suppressed from being raised upward by suppressing bending of the boundary part between the kick-up portion 34 and the high strength portion 35, the interference between the IPU 3 and the rear parcel shelf 26 (parcel cross member 25) may be suppressed, and thus the IPU 3 may be reliably protected.

In addition, in this embodiment, since the front end fastening portion 66 of the lower horizontal member 62 is fixed to the stiffener 42 with the kick-up portion 34 interposed therebetween, the lower horizontal member 62 may be disposed on the tilted surface of the kick-up portion 34, and the strength and rigidity of the kick-up portion 34 may be enhanced. Accordingly, the kick-up portion 34 may be reliably suppressed from being raised.

In addition, since the lower horizontal member 62 is bonded to the lower member 69 and the upper member 70 which are press-formed, it is possible to form the lower horizontal member 62 by 3D bending. Therefore, the lower horizontal member 62 may be reliably disposed following the upper surface of the rear frame 11, and thus the strength and rigidity of the rear frame 11 may be reliably enhanced.

Moreover, in this embodiment, since the rear end fastening portion 68 of the lower horizontal member 62 is formed to increase in width, the IPU protection guard 61 and the rear end fastening portion 68 may be disposed at the rear end fastening portion 68 of the lower horizontal member 62 having the increased width, thereby enhancing layout characteristics of assembly.

Moreover, since the pedestal portions 76 and 81 that abut on the upper surface of the rear frame 11 are formed at the parts where the intermediate fastening portion 67 and the rear end fastening portion 68 are positioned at the rear surface of the lower horizontal member 62, a gap is formed between the lower surface of the lower horizontal member 62 and the rear frame 11 in the vertical direction in parts other than each of the fastening portions 66 to 68. Therefore, the interference between the rear frame 11 and the lower horizontal member 62 due to vibration or the like is suppressed, and noise that is generated by the interference may be reduced. In addition, since the interference between the rear frame 11 and the lower horizontal member 62 is suppressed, rust prevention performance may be ensured without providing a dust sealer or the like for rust prevention therebetween.

In addition, since the intermediate fastening portion 67 is fastened to the part positioned in the vicinity of the bulk head 38 in the rear frame 11, the fastening strength of the intermediate fastening portion 67 and the rear frame 11 is enhanced, thereby further preventing the rear frame 11 at the kick-up portion 34 from being raised.

Moreover, since the front end fastening portion 66 is provided with the collar 73 that penetrates through the lower surface of the lower horizontal member 62 and abuts the upper surface of the rear frame 11, the cross-sectional crushing of the lower horizontal member 62 is suppressed, thereby enhancing the fastening strength of the front end fastening portion 66 and the rear frame 11.

In addition, since the IPU 3 is also fixed to the IPU attaching portion 75 of the lower horizontal member 62 in addition to the IPU mounting frame 51, oscillation of the IPU 3 is suppressed during turning or the like, and thus the IPU 3 may be stably supported.

In addition, the technical scope of the present invention is not limited to only each of the embodiments described above, and the above-described embodiments to which various modifications are added in a range that does not depart from the gist of the present invention are included. That is, the configurations and the like employed by the embodiments described above are only examples and may be appropriately changed.

For example, in the embodiments described above, the case where the vehicle body rear structure of the present invention is applied to the sedan type vehicle. However, the embodiments are not limited thereto, and may be applied to various vehicles.

In addition, the present invention may be widely applied to vehicles that are driven by batteries as power sources including electric vehicles, fuel cell vehicles, and the like.

In addition, in the embodiments described above, the configuration in which the lower horizontal member 62 of the IPU protection guard 61 also functions as the reinforcing bar is employed. However, the embodiments are not limited thereto, and only a reinforcing bar may be provided, or a reinforcing bar may be provided separately from the lower horizontal member 62.

Moreover, in the embodiments described above, the configuration in which the pedestal portions 76 and 81 that are swollen toward the rear frame 11 are provided in the intermediate fastening portion 67 and the rear end fastening portion 68 is described, but the embodiments are not limited thereto. That is, at least one fastening portion of the fastening portions 66 to 68 including the front end fastening portion 66 may be provided with the pedestal portion.

Besides, it is possible to appropriately substitute the constituent elements of the embodiments described above with well-known constituent elements in a range that does not depart from the gist of the present invention.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A vehicle body rear structure comprising:
a pair of left and right rear frames, which extend along a forward and rearward direction of a vehicle body on both sides along a vehicle width direction;
an electric device which is disposed between the rear frames and supplies power to an electric motor for travelling; and
a protection guard which surrounds the electric device from behind,
wherein the protection guard includes
a pair of left and right upper horizontal members, which extend along the forward and rearward direction above the electric device on both sides in the vehicle width direction of the electric device,
a pair of left and right lower horizontal members, which extend along the forward and rearward direction below the electric device on both the sides in the vehicle width direction of the electric device, and
an X-shaped member which extends in an X shape along a rear surface of the electric device, and
the X-shaped member bridges between the upper horizontal member on one side along the vehicle width direction from among the upper horizontal members and the lower horizontal member on the other side along the vehicle width direction from among the lower horizontal members, and between the upper horizontal member on the other side and the lower horizontal member on the one side.

2. The vehicle body rear structure according to claim 1, wherein the protection guard includes vertical members which bridge between end portions on the one side along the vehicle width direction and between end portions on the other side in the X-shaped member,
the X-shaped member and the vertical members are formed by extrusion molding of an aluminum alloy, and
the lower horizontal member and the upper horizontal member are made of steel pipes.

3. The vehicle body rear structure according to claim 2, wherein both upper and lower end portions of the vertical member are respectively fastened to rear end portions of the upper and lower horizontal members.

4. The vehicle body rear structure according to claim 2, wherein the vertical member is provided with a rib which divides an internal portion thereof in the vehicle width direction.

5. The vehicle body rear structure according to claim 2, wherein a corner member which connects the X-shaped member to each of the vertical members is provided inside a corner which is formed by an extension direction of the X-shaped member and an extension direction of each of the vertical members at a connection part between the X-shaped member and each of the vertical members, and
a corner plate which is bonded to the corner member, the X-shaped member, and the vertical member from the forward and rearward direction is provided at the connection part.

6. The vehicle body rear structure according to claim 2, wherein cooling air ducts through which cooling air for cooling the electric device is circulated extend on the opposite side to the electric device with the vertical members interposed therebetween, and
each of the upper horizontal member and the lower horizontal member extends outward in the vehicle width direction as it goes forward.

7. The vehicle body rear structure according to claim 2, wherein the rear end portion of the lower horizontal member increases in width along the vehicle width direction as it goes rearward and includes a fastening portion fastened to a rear end portion of the rear frame.

8. A vehicle body rear structure according to claim 1, wherein the rear frame includes a kick-up portion which is tilted downward as it goes forward, and a rearward extension portion which extends rearward from a rear end of the kick-up portion,
the electric device is disposed at a part where the kick-up portion is positioned between the rear frames, a reinforcing bar which extends along the forward and rearward direction following the rear frame is provided on an upper surface of the rear frame, and the reinforcing bar includes a front end fastening portion fastened to the kick-up portion, a rear end fastening portion fastened to the rearward extension portion, and an intermediate fastening portion fastened to the kick-up portion between the front end fastening portion and the rear end fastening portion.

9. The vehicle body rear structure according to claim 8, wherein a stiffener which connects the kick-up portion to a side sill disposed in front of the kick-up portion is provided in the kick-up portion, and the front end fastening portion of the reinforcing bar is fixed to the stiffener with the kick-up portion interposed therebetween.

10. The vehicle body rear structure according to claim 8, wherein the reinforcing bar has a closed cross-sectional structure in which a lower member and an upper member made of press components are bonded in a vertical direction, and is curved outward and downward as it goes forward.

11. The vehicle body rear structure according to claim 8, wherein the rear end fastening portion increases in width along the vehicle width direction as it goes rearward, and to a rear end surface thereof, the protection guard which surrounds the electric device from behind is attached.

12. The vehicle body rear structure according to claim 8, wherein, in a lower surface of the reinforcing bar, at a part where at least one fastening portion of the fastening portions is positioned, a pedestal portion which is swollen in a downward direction and abuts the rear frame is formed.

13. The vehicle body rear structure according to claim 8, wherein the intermediate fastening portion is fastened to, in a bulk head positioned in the rear frame or in the rear frame, a part positioned in the vicinity of the bulk head.

14. The vehicle body rear structure according to claim 8, wherein the front end fastening portion includes a collar which penetrates through a lower surface of the reinforcing bar and abuts the upper surface of the rear frame.

15. The vehicle body rear structure according to claim 8, wherein a mounting frame which supports the electric device from below is provided between the rear frames, and the reinforcing bar is provided with an attaching portion which supports the electric device from both sides in the vehicle width direction.

\* \* \* \* \*